J. H. TALGE.
STRUCTURAL MEMBER FOR AIRPLANES.
APPLICATION FILED FEB. 25, 1918.
1,276,993. Patented Aug. 27, 1918.
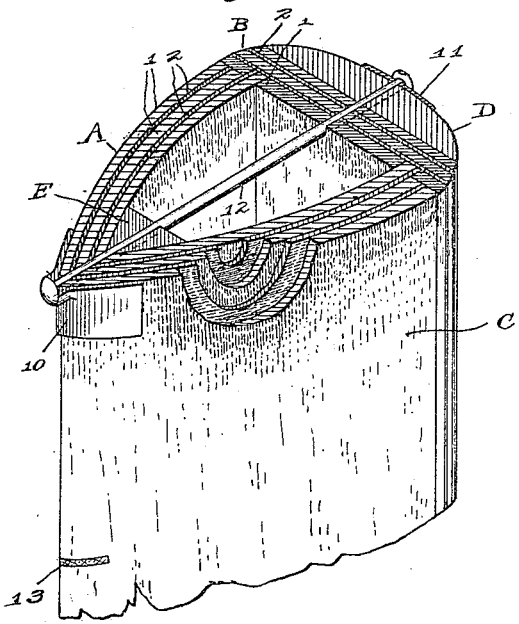
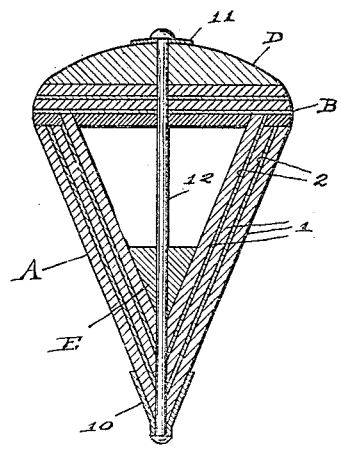
Witness
Frank A. Fahle
Inventor
John H. Talge,
By Hood & Schley
Attorneys

UNITED STATES PATENT OFFICE.

JOHN H. TALGE, OF INDIANAPOLIS, INDIANA.

STRUCTURAL MEMBER FOR AIRPLANES.

1,276,993.             Specification of Letters Patent.     Patented Aug. 27, 1918.

Application filed February 25, 1918. Serial No. 218,989.

*To all whom it may concern:*

Be it known that I, JOHN H. TALGE, a citizen of the United States, residing at Indianapolis, in the county of Marion and State of Indiana, have invented a new and useful Structural Member for Airplanes, of which the following is a specification.

The object of my invention is to produce a very strong but light structural member, especially adapted for use in air planes, either as wing beams or wing struts.

The accompanying drawings illustrate my invention. Figure 1 is a perspective section of a structural member constructed in accordance with my invention, and Fig. 2 a cross section of another form.

It is a well known fact that wood veneers may be built up into very strong members, but such veneers cannot be successfully bent into forms having a short radius, and while it has heretofore been proposed to protect or stiffen structural members by taking a core of wood and surrounding the same by one or more layers of veneer, yet such members cannot be satisfactorily produced in the small sizes necessary for air plane work.

In order to avoid the above-mentioned difficulty and to obtain a member of sufficient rigidity without the need of a solid core, my structural member is so formed of veneers that the veneers are not subjected to a high degree of curvature. As shown in Fig. 1, the member comprises three laminated members A, B and C, each comprising several layers, 1 and 2, layers 1 being preferably thicker than layers 2, and having the grain thereof running lengthwise of the structural member, while the grain of the layers 2 runs transversely. The inner pair 1 and 2 of the members A and B are projected enough beyond the ends of the outer layers to equal the thickness of the inner layer 1 of member B, so that the parts A, B and C are interlocked, as clearly shown in the drawings. The exterior faces of the members A and C are arranged at an angle to each other, so that the normally forward-going face of the structural member will be or approximate stream lines and in order to obtain the highest efficiency, the member B will be backed by a filler D, which will have a rear face approximating well-recognized stream lines.

It is also desirable that a small triangular filler E be placed in the point, or corner, between the members A and C and to which said members will be glued.

In order to obtain further stiffness, if desired, metal plates 10 and 11 may be provided for pressure distributers of tension rods 12 extended through the structural member. In the form shown in Fig. 1, tension rod 12 will tend to develop an arch stiffness in the side members A and C.

For further security, kerfs may be formed across the joint between the two side members A and B and strips of veneer 13 filled into these kerfs. By such an arrangement the filler E may be omitted under some circumstances.

I claim as my invention:

1. A structural member for air planes composed of laminated side members and a cross member, interlocked and having a long radius of curvature, and a tension member extended through the cross member and through the joint between the side members placing the side members under transverse compression.

2. A structural member for air planes composed of laminated side members and a cross member interlocked, and a tension member extended through the cross member and through the joint between the side members placing the side members under transverse compression.

3. A structural member for airplanes, composed of laminated side members having a long radius of curvature joined along two edges with their other edges materially separated, and a laminated cross member connecting and interlocked with said separated edges of the side members, the laminations of said cross member lying at substantially right angles to the laminations of the side members.

4. A structural member for air planes composed of laminated side members joined along two edges with their other edges materially separated, and a laminated cross member connecting and interlocked with said separated edges of the side members, the laminations of said cross member lying substantially at right angles to the laminations of the side members.

5. A structural member for airplanes composed of laminated side members, a laminated cross member interlocked with the side members, and locking members for the joint between the side members, said locking members being thin materials set in a kerf formed across the joint.

In witness whereof, I have hereunto set my hand at Indianapolis, Indiana, this twenty second day of February, A. D. one thousand nine hundred and eighteen.

JOHN H. TALGE.

Copies of this patent may be obtained for five cents each, by addressing the "Commissioner of Patents, Washington, D. C."